US007792932B2

(12) United States Patent
Doi et al.

(10) Patent No.: US 7,792,932 B2
(45) Date of Patent: Sep. 7, 2010

(54) SYSTEM AND METHOD FOR PROVIDING CONFIGURATION INFORMATION OF NETWORK-BASED APPARATUS

(75) Inventors: Koji Doi, Yokohama (JP); Masaki Nakano, Machida (JP); Jun Maeoka, Yokohama (JP); Akira Ioku, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 503 days.

(21) Appl. No.: 11/634,088

(22) Filed: Dec. 6, 2006

(65) Prior Publication Data

US 2007/0135931 A1 Jun. 14, 2007

(30) Foreign Application Priority Data

Dec. 6, 2005 (JP) ............................ 2005-351731

(51) Int. Cl.
*G06F 15/177* (2006.01)

(52) U.S. Cl. ...................... 709/221; 709/216; 709/224; 709/226

(58) Field of Classification Search ................. 709/216, 709/220–221, 222, 224, 226, 238
See application file for complete search history.

(56) References Cited

U.S. PATENT DOCUMENTS 6,169,988 B1 * 1/2001 Asakura ...................... 707/10
7,124,289 B1 * 10/2006 Suorsa .......................... 713/1
7,284,051 B1 * 10/2007 Okano et al. ................ 709/226
2003/0097427 A1 * 5/2003 Parry .......................... 709/220
2003/0187963 A1 * 10/2003 Tsai et al. ................... 709/220
2004/0137928 A1 * 7/2004 Biundo ....................... 455/517
2004/0236547 A1 * 11/2004 Rappaport et al. ............. 703/2
2005/0136845 A1 * 6/2005 Masuoka et al. .......... 455/67.14
2005/0198322 A1 * 9/2005 Takabayashi et al. ....... 709/228
2005/0235352 A1 * 10/2005 Staats et al. .................... 726/14
2005/0273488 A1 * 12/2005 Ryan et al. .................. 709/203
2006/0117115 A1 * 6/2006 Jo et al. .......................... 710/8
2007/0074063 A1 * 3/2007 Mondshine et al. ............ 714/4

FOREIGN PATENT DOCUMENTS

JP 2003-052090 2/2003

* cited by examiner

*Primary Examiner*—Oanh Duong
(74) *Attorney, Agent, or Firm*—Antonelli, Terry, Stout & Kraus, LLP.

(57) ABSTRACT

A method for automatically configuring an apparatus is provided by an apparatus configuration system including a plurality of apparatuses connected to a network, wherein the apparatuses include at least setting processing source apparatuses in which configuration information for configuring apparatus operation is stored, and a setting processing target apparatus for which the configuration information is to be set, and wherein at least one of the apparatuses has a setting processing execution unit that selects an apparatus being used by a user of the setting processing target apparatus among the setting processing source apparatuses and sets the configuration information about the setting processing target apparatus based on the configuration information stored in the selected apparatus.

6 Claims, 8 Drawing Sheets

FIG.4

24

| APPARATUS ID | TYPE | MODEL NAME |
|---|---|---|
| A | HDD RECORDER | HR1 |
| B | MOBILE PHONE | KD1 |
| C | TELEVISION | TV1 |
| D | TELEVISION | TV1 |

241 242 243

FIG.5

15

| APPARATUS ID | RADIO FIELD INTENSITY (dBm) |
|---|---|
| B | -55 |
| C | -60 |
| D | -80 |

151 152

FIG.6

25

| TRANSLATION RULE ID | TRANSLATION SOURCE | TRANSLATION TARGET |
| --- | --- | --- |
| T_KD1_HR1 | KD1 | HR1 |
| T_TD1_HR1 | TV1 | HR1 |
| T_KD1_TV1 | KD1 | TV1 |

251 252 253

FIG.7

27

| MODEL NAME | APPARATUS CONFIGURATION ADAPTER ID |
| --- | --- |
| HR1 | A_HR1 |
| KD1 | A_KD1 |
| TV1 | A_TV1 |

271 272

FIG.8A 26 (T_KD1_HR1)

| TRANSLATION SOURCE ITEM | TRANSLATION TARGET ITEM |
|---|---|
| USER INTERFACE | MENU DESIGN |
| LANGUAGE | LANGUAGE |

261 262

FIG.8B 26 (T_TV1_HR1)

| TRANSLATION SOURCE ITEM | TRANSLATION TARGET ITEM |
|---|---|
| RECEIVED CHANNEL | RECEIVED CHANNEL |
| FAVORITE PROGRAM GENRE | AUTO RECORDING OBJECT |

261 262

FIG.9A

14

| ITEM | VALUE |
|---|---|
| LANGUAGE | UNSET |
| MENU DESIGN | UNSET |
| RECEIVED CHANNEL | UNSET |
| AUTO RECORDING OBJECT | UNSET |

141 142

FIG.9B

14

| ITEM | VALUE |
|---|---|
| LANGUAGE | JAPANESE |
| MENU DESIGN | SIMPLE |
| RECEIVED CHANNEL | YOKOHAMA |
| AUTO RECORDING OBJECT | MOVIE |

141 142

FIG.10

14

| ITEM | VALUE |
|---|---|
| USER INTERFACE | SIMPLE |
| LANGUAGE | JAPANESE |

141 142

FIG.11

14

| ITEM | VALUE |
|---|---|
| RECEIVED CHANNEL | YOKOHAMA |
| FAVORITE PROGRAM GENRE | MOVIE |

141 142

FIG.12

14

| ITEM | VALUE |
|---|---|
| RECEIVED CHANNEL | CATV |
| FAVORITE PROGRAM GENRE | SPORT |

141 142

SYSTEM AND METHOD FOR PROVIDING CONFIGURATION INFORMATION OF NETWORK-BASED APPARATUS

CROSS-REFERENCE TO RELATED APPLICATION

This application claims priority from Japanese Patent Application JP 2005-351731, filed on Dec. 6, 2005, the content of which is hereby incorporated by reference into this application.

BACKGROUND OF THE INVENTION

The present invention relates to a method and system for configuring network-connected apparatuses.

In recent years, apparatuses with an embedded computer such as mobile phones and home information appliances have become increasingly sophisticated. This has complicated configuration items for adjusting the operation of the apparatuses. For optimal operation of the apparatuses, a user must appropriately set the configuration items. However, for conventional apparatuses, the user needs to appropriately set the configuration items for every new apparatus the user introduces, and this has bothered the user. This problem is especially pronounced if the user is not experienced at using the apparatus.

There are known techniques by which an apparatus automatically set minimum configuration items required for the apparatus to operate.

For example, there is a technique for automatically setting a required address setting when an apparatus is connected to a network.

However, it is difficult for each apparatus to automatically set configuration items unique to the type of the apparatus. In addition, without user information, the apparatus cannot automatically set configuration items related to user preferences.

As a measure to alleviate this problem, a method disclosed in JP-A-2003-52090 is known. This method includes obtaining configuration information from apparatuses of the same type connected with a target apparatus via a network, and setting the configuration information as setting values of configuration items for the target apparatus.

SUMMARY OF THE INVENTION

However, in the method described in JP-A-2003-52090, since the configuration information is transmitted between the apparatuses, the apparatuses need to be provided with a standard interface and protocol. This causes increases in the designing and manufacturing costs of the apparatuses.

Further, this method does not allow transmission of the configuration information between different types of apparatuses. That is, this method is effective only when the same type of apparatuses are connected with each other on the network and does not allow automatically setting the configuration information about a different type of apparatus.

Further, if there are more than one apparatus from which the configuration information may be copied on the network, this method does not allow the target apparatus to automatically select an apparatus as a copy source. Therefore, the user determines from which apparatus the configuration information is to be copied. With the method like this, the user may not be able to select an appropriate apparatus.

In another known method, a setting screen about an apparatus for which the configuration information is to be modified is displayed in a web browser on a computer connected to the apparatus via a network. A user inputs the configuration information on the setting screen. However, this method involves the user's setting of the configuration information.

An object of the present invention is to provide an apparatus configuration method for automatically setting configuration information about an apparatus. Another object of the present invention is to provide the apparatus configuration method that does not require a standard interface and protocol for transmitting the configuration information between apparatuses. Another object of the present invention is to provide the apparatus configuration method that allows automatic setting of the configuration information even among different types of apparatuses.

According to an embodiment of the present invention, in an apparatus configuration system including apparatuses connected to a network, the apparatuses include at least setting processing source apparatuses in which configuration information for configuring apparatus operation is stored, and a setting processing target apparatus for which the configuration information is to be set. At least one of the apparatuses has a setting processing execution unit that selects an apparatus being used by a user of the setting processing target apparatus among the setting processing source apparatuses and sets the configuration information about the setting processing target apparatus based on the configuration information stored in the selected apparatus.

According to the present invention, an apparatus configuration method for automatically setting configuration information for apparatus configuration can be provided. Other objects, features, and advantages of the present invention will become apparent from the following description of an embodiment thereof associated with the accompanied drawings.

BRIEF DESCRIPTION OF THE DRAWINGS

FIG. 4 is a diagram showing an exemplary structure of an apparatus management table;

FIG. 5 is a diagram showing a radio field intensity measurement result;

FIG. 6 is a diagram showing an exemplary structure of a configuration information translation rule management table;

FIG. 7 is a diagram showing an exemplary structure of an apparatus configuration adapter management table;

FIGS. 8A and 8B are diagrams showing structures of configuration information translation rules;

FIGS. 9A and 9B are diagrams showing structures of configuration information about an apparatus (an HDD recorder) before setting processing is performed;

FIG. 10 is a diagram showing a structure of the configuration information about an apparatus (a mobile phone);

FIG. 11 is a diagram showing a structure of the configuration information about an apparatus (a television);

FIG. 12 is a diagram showing a structure of the configuration information about an apparatus (a television)

DESCRIPTION OF THE EMBODIMENTS

An embodiment of the present invention will be described below with reference to the drawings.

Figure 1:
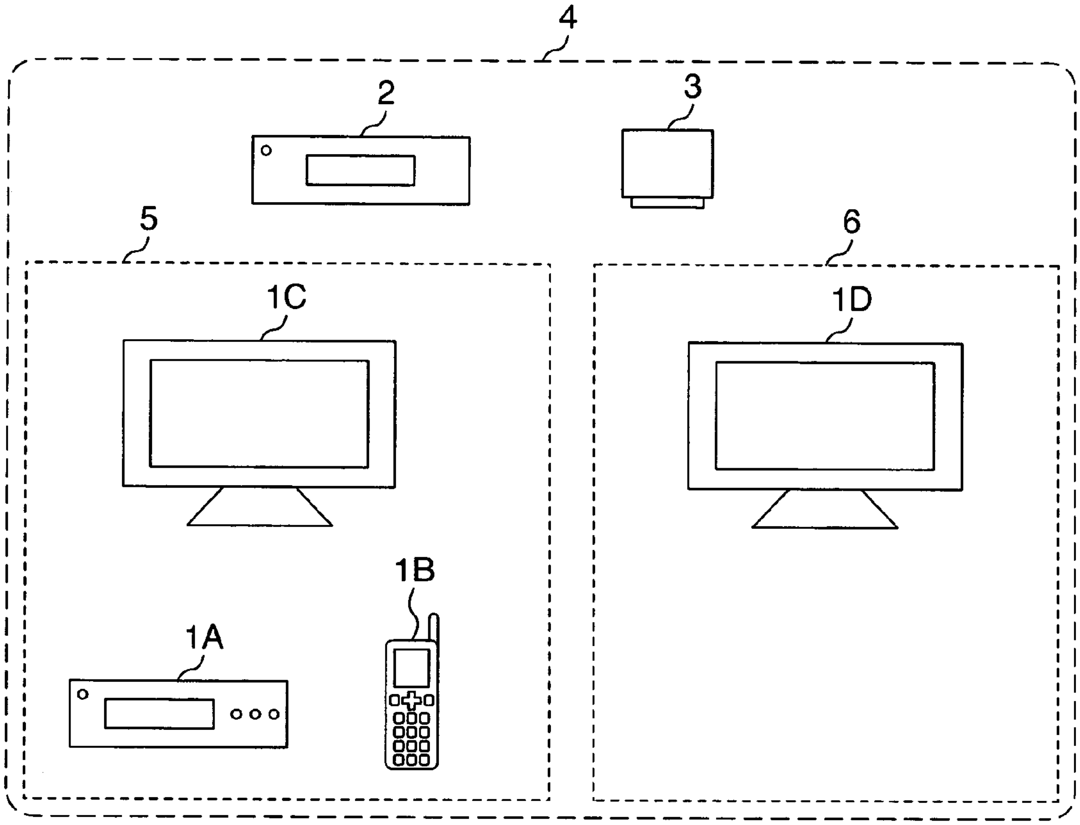
FIG. 1 is a system configuration diagram showing a configuration of a computer system in an embodiment of the present invention.

FIG. 1 is a system configuration diagram showing a configuration of a computer system in an embodiment of the present invention.

The computer system includes apparatuses 1A, 1B, 1C, and 1D, a home server 2, and a wireless LAN access point 3.

Specifically, the apparatus 1A is an HDD (Hard Disk Drive) recorder, the apparatus 1B is a mobile phone, and the apparatuses 1C and 1D are video display devices such as television receivers. In the following description, the apparatus 1A will be referred to as the HDD recorder 1A, the apparatus 1B as the mobile phone 1B, the apparatus 1C as the video display device 1C, and the apparatus 1D as the video display device 1D.

The HDD recorder 1A, the mobile phone 1B, the video display device 1C and the video display device 1D, and the home server 2 are connected with each other by a wireless LAN in infrastructure mode via the wireless LAN access point 3, so that they form a home network 4.

Different users use a room 5 and a room 6 respectively, and the apparatuses provided in each room are used by the user of the room. The room 5 is provided with the HDD recorder 1A, the mobile phone 1B, and the video display device 1C. The HDD recorder 1A is a new apparatus added by the user. The room 6 is provided with the video display device 1D. The user of the HDD recorder 1A, the mobile phone 1B, and the video display device 1C differs from the user of the video display device 1D.

Figure 2:
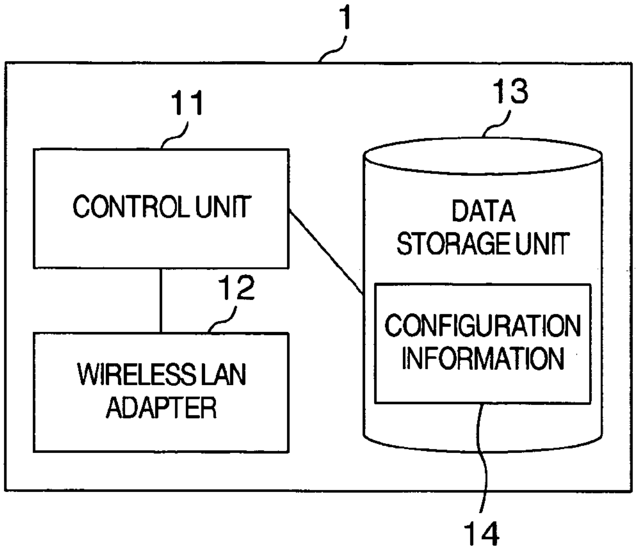
FIG. 2 is a block diagram of an apparatus.

FIG. 2 is a block diagram of the apparatus 1 shown in FIG. 1. It is to be noted that the HDD recorder 1A, the mobile phone 1B, and the video display device 1C and the video display device 1D are collectively called as the apparatuses 1.

The apparatus 1 includes a control unit 11, a wireless LAN adapter 12, and a data storage unit 13.

The control unit 11 includes a processor and memory and performs various kinds of processing by using the wireless LAN adapter 12 and the data storage unit 13. The wireless LAN adapter 12 connects the apparatus 1 to the network to communicate with the other apparatuses connected to the network. The data storage unit 13 is a disk device and stores configuration information 14. The configuration information 14 is information for adjusting the operation of the apparatus 1.

Figure 3:
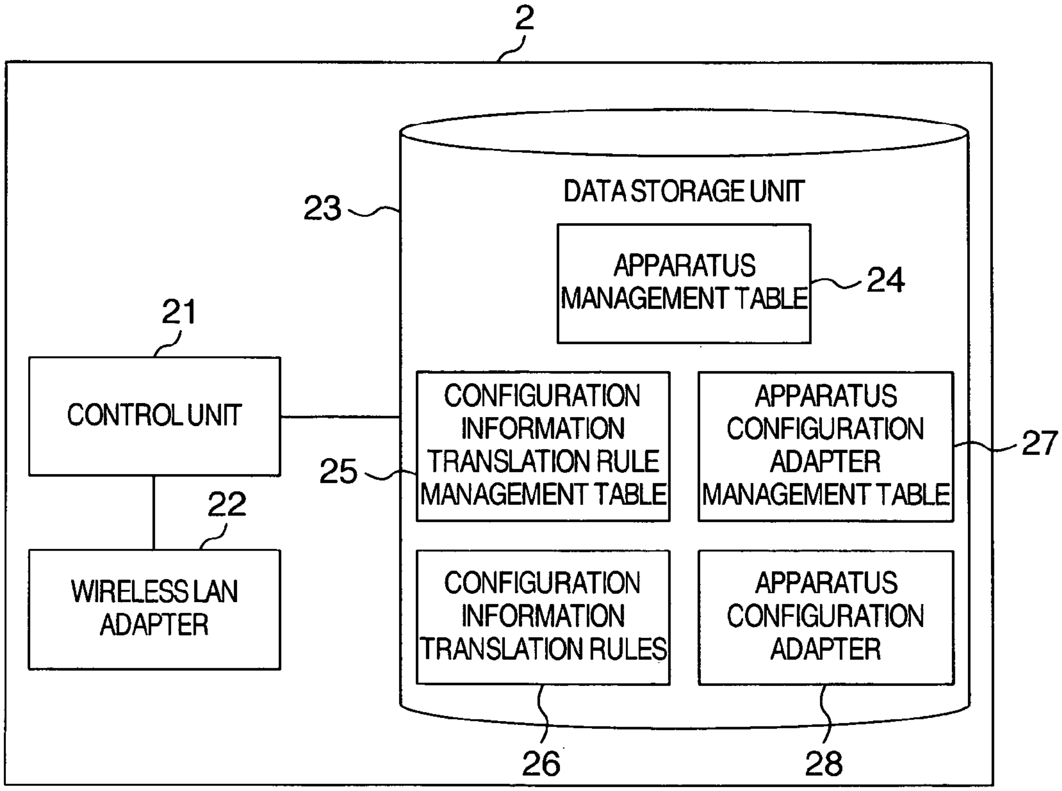
FIG. 3 is a block diagram of a home server.

FIG. 3 is a block diagram of the home server 2 shown in FIG. 1.

The home server 2 includes a control unit 21, a wireless LAN adapter 22, and a data storage unit 23.

The control unit 21 includes a processor and memory and performs various kinds of processing by using the wireless LAN adapter 22 and the data storage unit 23. The wireless LAN adapter 22 connects the home server 2 to the network to communicate with the other apparatuses connected to the network.

The data storage unit 23 stores an apparatus management table 24, a configuration information translation rule management table 25, configuration information translation rules 26, an apparatus configuration adapter management table 27, and apparatus configuration adapters 28.

The apparatus management table 24 is a table for managing the apparatuses 1 connected to the home network 4. The configuration information translation rule management table 25 is a table for the home server 2 to manage the configuration information translation rules 26. The configuration information translation rules 26 match the configuration information 14 in translation sources and the configuration information 14 in translation targets. The apparatus configuration adapter management table 27 is a table for the home server 2 to manage the apparatus configuration adapters 28. The apparatus configuration adapters 28 are programs required for the home server to obtain the configuration information 14 from the apparatuses 1 and to set values 142 in the configuration information 14 for the apparatuses 1.

FIG. 4 is a diagram showing an exemplary structure of the apparatus management table 24.

The apparatus management table 24 is stored in the data storage unit 23. The apparatus management table 24 contains apparatus IDs 241, types 242, and model names 243.

The apparatus IDs 241 are unique identifiers indicating the apparatuses 1A to 1D. The types 242 indicate the types of the apparatuses 1A to 1D. The model names 243 indicate the model names of the apparatuses 1A to 1D.

Once each apparatus 1 connects to the home network 4, the apparatus 1 transmits information including the type 242 and the model name 243 onto the home network 4. The home server 2, having received the information, sets the apparatus ID 241 and stores the received information in the apparatus management table 24.

FIG. 5 is a diagram showing a radio field intensity measurement result 15 measured between the HDD recorder 1A and the other apparatuses (the mobile phone 1B and the video display device 1C and the video display device 1D).

The home server 2 transmits, to the new additional HDD recorder 1A via the home network 4, a request to obtain the distances to the mobile phone 1B and the video display device 1C and the video display device 1D connecting to the home network 4. The HDD recorder 1A receives the request and connects with the mobile phone 1B and the video display device 1C and the video display device 1D via the wireless LAN in ad hoc mode that bypasses the wireless LAN access point 23.

Specifically, having received the request from the home server 2, the HDD recorder 1A requests the other apparatuses 1 to make a connection via the wireless LAN in ad hoc mode that bypasses the wireless LAN access point 3. The HDD recorder 1A receives radio waves from the other apparatuses 1, measures their radio field intensity, and generates the radio wave measurement-result 15. The HDD recorder 1A then transmits the radio wave measurement result 15 to the home server 2.

In this embodiment, the other apparatuses 1 transmit the radio waves while the HDD recorder 1A measures the radio field intensity. Alternatively, the other apparatuses 1 may measure the radio field intensity of radio waves transmitted by the HDD recorder 1A.

In this alternative case, the other apparatuses 1 transmit the radio field intensity to the home server 2, which then receives the radio field intensity and generates the radio wave measurement result 15. It is also possible that the other apparatuses 1 transmit the radio field intensity to the HDD recorder 1A, which then receives the radio field intensity, generates the radio wave measurement result 15, and transmits the radio wave measurement result 15 to the home server 2.

The radio field intensity measurement result 15 contains apparatus IDs 151 and radio field intensities 152. The apparatus IDs 151 are unique identifiers indicating the mobile phone 1B and the video display device 1C and the video display device 1D. The radio field intensities 152 indicate the intensities of the radio waves received by the mobile phone 1B and the video display device 1C and the video display device 1D.

The greater value of the radio field intensity 152 an apparatus has, the closer the apparatus is to the HDD recorder 1A. The apparatus closest to the HDD recorder 1A is the mobile phone 1B, followed by the video display device 1C, and the video display device 1D is the farthest.

FIG. 6 is a diagram showing an exemplary structure of the configuration information translation rule management table 25.

The configuration information translation rule management table 25 manages the configuration information translation rules 26. The configuration information translation rule management table 25 is stored in the data storage unit 23 of the home server 2.

The configuration information translation rule management table 25 contains translation rule IDs 251, translation sources 252, and translation targets 253.

The translation rule IDs 251 are unique identifiers for identifying the configuration translation rules 26. For example, "T_KD1_HR1" indicates a rule that values 142 in the configuration information 14 for the model name "KD1" should be applied to values 142 in the configuration information 14 for the model name "HR1".

The translation targets 253 indicate the model names of apparatuses 1 for which values 142 in the configuration information 14 are to be set. The translation sources 252 indicate the model names of apparatuses 1 that are the sources referred to in this setting processing.

FIG. 7 is a diagram showing an exemplary structure of the apparatus configuration adapter management table 27.

The apparatus configuration adapter management table 27 contains model names 271 and apparatus configuration adapter IDs 272.

Each apparatus configuration adapter 28 is a program required for reading the configuration information 14 from apparatuses with a model name 271, and for writing the configuration information 14 to the apparatuses with the model name 271. The apparatus configuration adapter 28 may be a program executable by itself or may be a module constituting a fragment of a program and not executable by itself.

The model names 271 indicate the model names of apparatuses 1 from or to which the corresponding apparatus configuration adapters 28 can read or write the configuration information 14. The apparatus configuration adapter IDs 272 are unique identifiers indicating the apparatus configuration adapters 28 corresponding to the respective model names 271.

For example, the apparatus configuration adapter ID "A_HR1" is used to read or write the configuration information 14 about apparatuses with the model name "HR1".

The home server 2 may download an apparatus configuration adapter 28 corresponding to a new model name from distribution servers of manufacturers of the apparatuses 1.

FIG. 8A is a diagram showing a structure of a configuration information translation rule 26 (T_KD1_HR1)

The configuration information translation rule 26 contains translation source items 261 and translation target items 262.

The configuration information translation rule 26 applies the configuration information 14 about a translation source to the configuration information 14 about a translation target. Specifically, the home server 2 refers to the configuration information translation rule 26 to set values 142 of the translation source items 261 as values 142 of the translation target items 262.

The home server 2 refers to the configuration information translation rule 26 (T_KD1_HR1) to set the value of the translation source item "user interface" for the model name "KD1" as the value of the translation target item "menu design" for the model name "HR1", and to set the value of the translation source item "language" to the value of the translation target item "language."

FIG. 8B is a diagram showing a structure of a configuration information translation rule 26 (T_TV1_HR1).

The home server 2 refers to the configuration information translation rule 26 (T_TV1_HR1) to set the value of the translation source item "received channel" for the model name "TV1" as the value of the translation target item "received channel", and to set the value of the translation source item "favorite program genre" for the model name "HR1" to the value of the translation target item "automatic recording target."

The home server 2 may download a configuration information translation rule 26 corresponding to a new model name from the distribution servers of the manufacturers of the apparatuses 1.

FIG. 9A is a diagram showing a structure of the configuration information 14 about the HDD recorder 1A before the setting processing is performed.

The configuration information 14 about the HDD recorder 1A contains items 141 and values 142. The items 141 include "language", "menu design", "received channel", and "auto recording object." For all items, the values 142 are all "unset" because they are not yet set.

FIG. 9B is a diagram showing a structure of the configuration information 14 about the HDD recorder 1A after the setting processing has been performed.

The items 141 are the same as those in the configuration information 14 about the HDD recorder 1A before the translation processing is performed. As for the values 142, since the setting processing has been performed, each item has a corresponding value automatically set by the home server 2.

FIG. 10 is a diagram showing a structure of the configuration information 14 about the mobile phone 1B (cell phone).

The configuration information 14 about the mobile phone 1B contains items 141 and values 142.

The items 141 include "user interface" and "language." The values 142 are set to "simple" for the "user interface", and to "Japanese" for the "language."

FIG. 11 is a diagram showing a structure of the configuration information 14 about the video display device 1C (television).

The configuration information 14 about the video display device 1C contains items 141 and values 142. The items 141 include "received channel" and "favorite program genre." The values 142 are set to "Yokohama" for the "received channel", and to "movie" for the "favorite program genre".

FIG. 12 is a diagram showing a structure of the configuration information 14 about the video display device 1D (television).

The items 141 include "received channel" and "favorite program genre". The values 142 are set to "CATV" for the "received channel", and to "sport" for the "favorite program genre".

Figure 13:
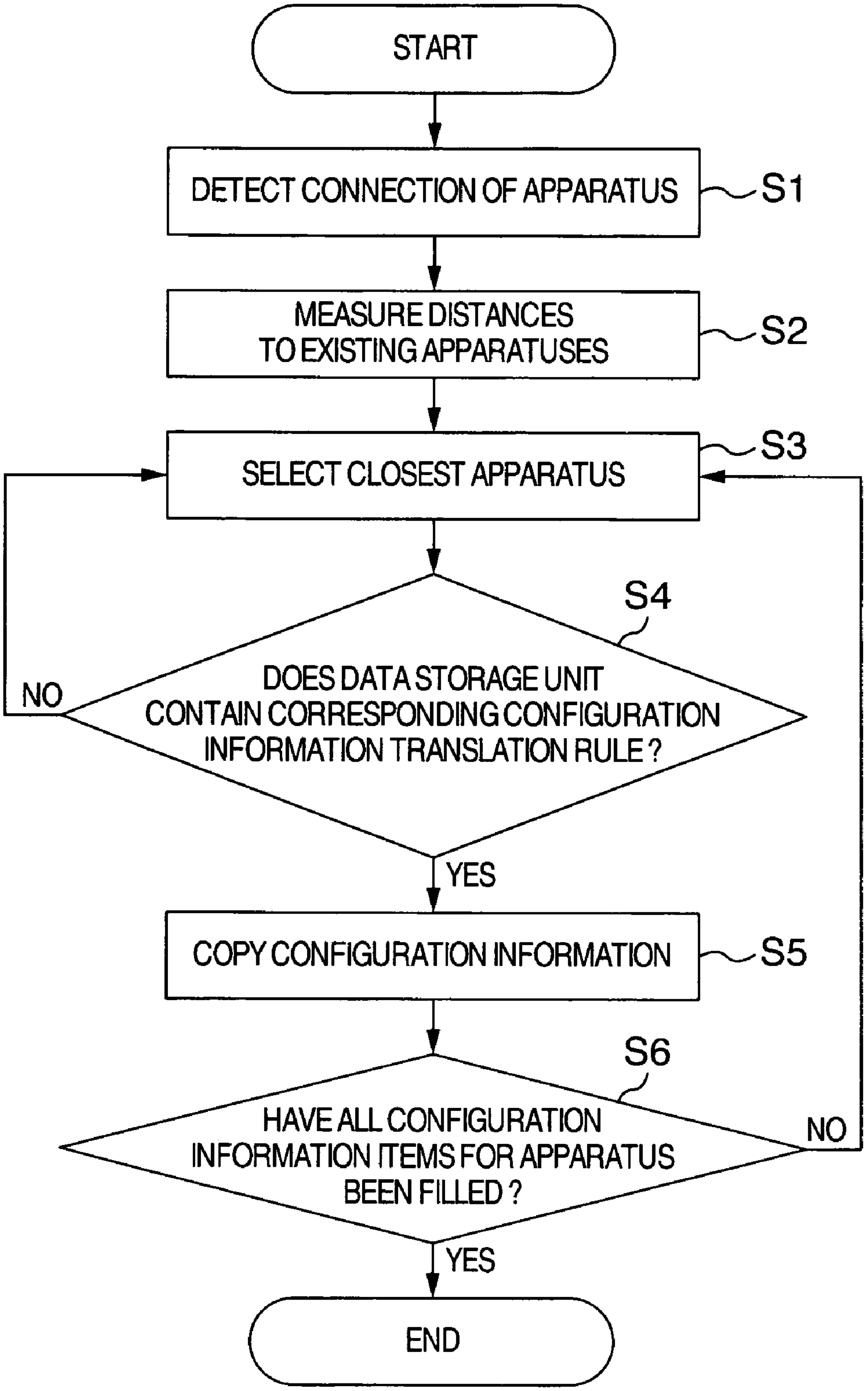
FIG. 13 is a flowchart showing a process of the setting processing.

FIG. 13 is a flowchart showing a process of the setting processing.

The HDD recorder 1A is the new additional apparatus 1 added by the user. The home server 2 adds information about the HDD recorder 1A to the apparatus management table 24 (step S1).

Next, the home server 2 transmits to the HDD recorder 1A a request to obtain the distances to the mobile phone 1B and the video display device 1C and the video display device 1D connected to the home network 4. Having received the request from the home server 2, the HDD recorder 1A requests the other apparatuses 1 to make a connection via the wireless LAN in ad hoc mode that bypasses the wireless LAN access point 3. The HDD recorder 1A receives radio waves from the other apparatuses 1, measures their radio field intensity, and generates the radio wave measurement result 15.

Then, the HDD recorder 1A transmits the radio wave measurement result 15 to the home server 2 (step S2).

The home server 2 receives the radio wave measurement result 15 from the HDD recorder 1A and stores the radio wave measurement result 15 in the data storage unit 23.

Although the received signal intensity is used in this embodiment, the ratio between the radio wave and noise received at each apparatus 1 (S/N ratio or C/N ratio) may also be used.

Next, the home server 2 refers to the radio wave measurement result 15 to select the mobile phone 1B, which is the closest to the HDD recorder 1A, as the apparatus being used by the user of the HDD recorder 1A (step S3). Specifically, the home server 2 selects an apparatus 1 with the highest radio field intensity 152 in the radio wave measurement result 15 among apparatuses 1 that have not been selected.

Next, the home server 2 determines whether or not the data storage unit 23 contains a configuration information translation rule 26 corresponding to the setting processing for setting the values 142 in the configuration information 14 about the mobile phone 1B as the values 142 in the configuration information 14 about the HDD recorder 1A (step S4). Specifically, the home server 2 searches for a translation rule ID 251 for which the translation source 252 in the configuration information translation rule management table 25 is "KD1" and the translation target 253 in the configuration information translation rule management table 25 is "HR1". This is met by the translation rule ID 251 "T_KD1_HR1", so that the process proceeds to step S5. If the data storage unit 23 does not contain the corresponding configuration information translation rule 26, the process returns to step S3.

Next, the home server 2 performs the setting processing for setting the values 142 in the configuration information 14 about the mobile phone 1B as the values 142 in the configuration information 14 about the HDD recorder 1A (step S5).

Specifically, the home server 2 refers to the apparatus configuration adapter management table 27 to obtain the apparatus configuration adapter ID 272 "A_KD1" matching with the model name KD1 of the mobile phone 1B. The home server 2 also refers to the apparatus configuration adapter management table 27 to obtain the apparatus configuration adapter ID 272 "A_HR1" matching with the model name HR1 of the HDD recorder 1A.

The home server 2 obtains the configuration information 14 about the mobile phone 1B by using the apparatus configuration adapter 28 "A_KD1" corresponding to the mobile phone 1B. The home server 2 refers to the configuration information translation rule 26 to set the value "simple" of the translation source item "user interface" as the value 142 of the translation target item "menu design" by using the apparatus configuration adapter 28 "A_HR1" corresponding to the mobile phone 1A selected by the home server 2 as the apparatus being used by the user of the HDD recorder 1A. The home server 2 also sets the value "Japanese" of the translation source item "language" as the value 142 of the translation target item "language" (step S5).

Next, the home server 2 determines whether or not the setting processing has been performed for all items 141 in the configuration information 14 about the HDD recorder 1A (step S6). As the setting processing has not been performed for the "received channel" and "auto recording object", the process returns to step S3.

Since the mobile phone 1B has been selected by the home server 2 as the apparatus being used by the user of the HDD recorder 1A, the mobile phone 1B is excluded in the selection in step S3. Therefore, the home server 2 refers to the radio wave measurement result 15 to select the video display device 1C, which is the second closest to the HDD recorder 1A (step S3).

Next, the home server 2 determines whether or not the data storage unit 23 contains a configuration information translation rule 26 corresponding to the setting processing for setting the values 142 in the configuration information 14 about the video display device 1C as the values 142 in the configuration information 14 about the HDD recorder 1A (step S4). This is met by the translation rule ID 251 "T_TV1_HR1", so that the process proceeds to step S5.

Next, the home server 2 refers to the apparatus configuration adapter management table 27 to obtain the apparatus configuration adapter ID 272 "A_TV1" matching with the model name TV1 of the video display device 1C. The home server 2 also refers to the apparatus configuration adapter management table 27 to obtain the apparatus configuration adapter ID 272 "A_HR1" matching with the model name HR1 of the HDD recorder 1A.

The home server 2 obtains the configuration information 14 about the translation source apparatus TV1 by using the apparatus configuration adapter 28 "A_TV1" corresponding to the video display device 1C selected by the home server 2 as the apparatus being used by the user of the HDD recorder 1A.

The home server 2 refers to the configuration information translation rule 26 (T_TV1_HR1) to set the value "Yokohama" of the translation source item "received channel" as the value 142 of the translation target item "received channel" by using the apparatus configuration adapter 28 "A_HR1" corresponding to the HDD recorder 1A. The home server 2 also sets the value "movie" of the translation source item "favorite program genre" as the value 142 of the translation target item "auto recording object" (step S5).

Next, the home server 2 determines whether or not the setting processing has been performed for all items 141 in the configuration information 14 about the HDD recorder 1A (step S6). As the setting processing has been performed for all items 141 in the configuration information 14 about the HDD recorder 1A, the setting processing is finished.

As described above, in this embodiment, the home server 2 copies the configuration information from the apparatus 1 located closest to the HDD recorder 1A. Therefore, the configuration information 14 about the mobile phone 1B and the video display device 1C being used by the user of the HDD recorder 1A can be set as the configuration information 14 about the HDD recorder 1A. This allows the home server 2 to automatically set the configuration information 14 optimal for the user of the HDD recorder 1A.

If the home server 2 did not perform the setting processing for setting the values 142 in the configuration information 14 about the HDD recorder 1A by copying from the mobile phone 1B located closest to the HDD recorder 1A, the home server 2 could perform the setting processing by selecting the video display device 1D not being used by the user of the HDD recorder 1A. Since the configuration information 14 is set to allow the apparatuses 1 to operate optimally for their respective users, setting the values 142 in the configuration information 14 about the video display device 1D being used by the other user as the values 142 in the configuration information 14 about the HDD recorder 1A would not be the optimal setting for the user of the HDD recorder 1A.

In the embodiment of the present invention, in step S3 of FIG. 13, the apparatus 1 closest to the additional apparatus 1 is selected according to the radio field intensity in the radio field intensity measurement result 15. Alternatively, the GPS (Global Positioning System) may be used. That is, each apparatus 1 has a GPS antenna, so that the apparatus 1 computes location information based on information obtained from the GPS antenna. The home server 2 computes the distances between the apparatuses 1 based on the location information.

In the embodiment of the present invention, the home server 2 has the apparatus management table 24, the configuration information translation rule management table 25, the configuration information translation rules 26, the apparatus configuration adapter management table 27, and the apparatus configuration adapters 28 stored in the data storage unit 23, thereby performing the setting processing illustrated in FIG. 13. Alternatively, each apparatus 1 may have the apparatus management table 24, the configuration information translation rule management table 25, the configuration information translation rules 26, the apparatus configuration adapter management table 27, and the apparatus configuration adapters 28 stored in the data storage unit 13, thereby performing the setting processing illustrated in FIG. 13.

The above description assumes that the home server 2 may download, from the distribution servers of the manufacturers, a new configuration information translation rule management table 25, configuration information translation rules 26, apparatus configuration adapter management table 27, and apparatus configuration adapters 28 if present. Alternatively, the manufacturer of an additional apparatus 1 may sell the additional apparatus 1 with its data storage unit 13 containing the new configuration information translation rule management table 25, configuration information translation rules 26, apparatus configuration adapter management table 27, and apparatus configuration adapters 28.

While the above description has been made with respect to the embodiment, it is apparent to those skilled in the art that the present invention is not limited to the described embodiment but various changes and modifications may be made thereto within the range of the spirit of the invention and the appended claims.

The invention claimed is:

1. An apparatus configuration method for a plurality of apparatuses connected to a network, wherein: a server that controls configuration of the apparatuses is connected to the network and a first apparatus and a second apparatus that have already been configured are connected to the network; the apparatus configuration method being effected by the server and comprising:

obtaining, when a third apparatus is additionally connected to the network, apparatus information of the third apparatus;

obtaining measurement of a distance between the connected third apparatus and the first apparatus, and a distance between the connected third apparatus and the second apparatus;

determining which of the first and second apparatuses is closer to the third apparatus;

if the distance between the first and third apparatuses is shorter than the distance between the second and third apparatuses, obtaining configuration information about the first apparatus from the first apparatus;

generating configuration information for the third apparatus based on the obtained configuration information about the first apparatus, and providing the third apparatus with the generated configuration information;

where the generating the configuration information about the third apparatus is based on configuration information translation rules registered in advance with the server, and if a translation rule between the first and third apparatuses is not included in the configuration information translation rules or does not provide sufficient information, the configuration information translation rules are applied in order of increasing distance of the plurality of apparatuses to the third apparatus.

2. The apparatus configuration method according to claim 1, wherein the server delegates obtaining the distance between the third and first apparatuses to the first apparatus, and delegates obtaining the distance between the third and second apparatuses to the second apparatus and the first and second apparatuses each informs the server of the distance to the third apparatus.

3. The apparatus configuration method according to claim 2, wherein the first and second apparatuses each determines the distance based on a radio intensity of wireless communication with the third apparatus.

4. The apparatus configuration method according to claim 1, wherein the server requests the third apparatus to obtain the distances to the first and second apparatuses and the third apparatus provides the server with information about the obtained distances to the first and second apparatuses.

5. The apparatus configuration method according to claim 4, wherein the third apparatus determines the distances based on radio field intensities of wireless communication with the first and second apparatuses.

6. The apparatus configuration method according to claim 1, wherein each configuration information translation rule is downloaded from a distribution server of a manufacturer of the first, second, or third apparatus.

* * * * *